July 13, 1948.  D. T. COLTON  2,445,210
MANUFACTURE OF FIBRO-CEMENTITIOUS SHEETS
Filed Dec. 4, 1945
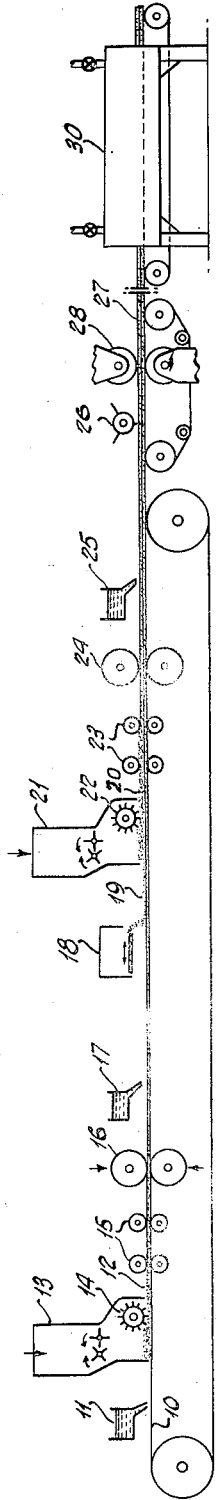
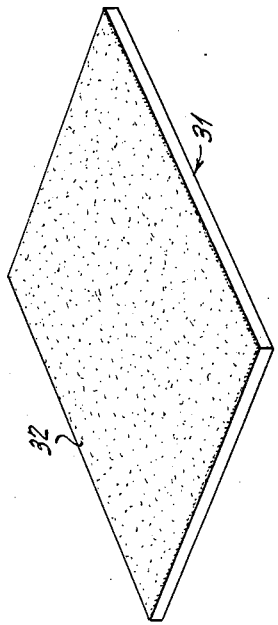
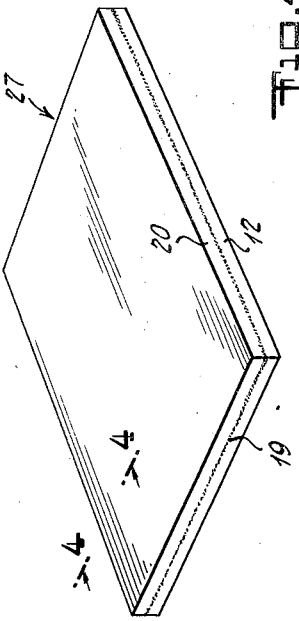
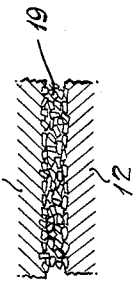
INVENTOR
DUDLEY T. COLTON.
BY Virgil C. Kline
ATTORNEY Patented July 13, 1948

2,445,210

UNITED STATES PATENT OFFICE 2,445,210

MANUFACTURE OF FIBRO-CEMENTITIOUS SHEETS

Dudley T. Colton, Martinsville, N. J., assignor to Johns-Manville Corporation, New York, N. Y., a corporation of New York Application December 4, 1945, Serial No. 632,669

5 Claims. (Cl. 18—60)

1

This invention relates to the manufacture of hard and dense fibro-cementitious sheets. A primary object of the invention is to provide an improved method of developing an attractive surface for asbestos-cement shingles and siding sheets.

Another object is to provide a highly efficient method of manufacturing dense structural fibro-cementitious sheets having irregular textured surfaces.

A further object is that of developing irregular textured surfaces while doubling the rate of output of the equipment which is employed for producing structural sheets of a given size and shape.

With the above objects in view the invention consists in the improved method of manufacturing hard and dense fibro-cementitious sheets which is hereinafter described and more particularly defined by the accompanying claims.

The invention will be illustrated by description in connection with the attached drawings, in which:

Fig. 1 is a diagrammatic assembly view of apparatus adapted for manufacturing hard and dense fibro-cementitious sheets in accordance with the present invention;

Fig. 2 is a perspective view of a composite fibro-cementitious sheet produced as an intermediate product by the process;

Fig. 3 is a face view of a hard and dense structural fibro-cementitious sheet having an irregular textured surface such as forms the final product of the process; and Fig. 4 portrays diagrammatically in a magnified sectional view the manner in which the dry finely divided mineral particles or grains which form the parting and surfacing layer develop an interlocking mechanical bond between face layers of moist compressible asbestos-cement composition under the high pressure densifying operation on the composite article.

A feature of the present method of producing fibro-cementitious sheets resides in the operating steps whereby a dense composite multiple layer sheet of fiber-cement composition is first formed and then split along intersecting cleavage planes formed by a thin parting or cleavage layer sandwiched between and paralleling two fiber-cement layers, thus producing at least two thin shingles or siding units each having an attractive irregular textured surface which is thinly coated with parting layer material.

The process may be practiced on a continuous cycle as follows: The top surface of an endless belt conveyor 10 (Fig. 1) is moistened with water,

2 which is applied thereto from a source of water supply 11. A fluffed dry mixture comprising finely divided hydraulic cement and short asbestos fibers of group 6 classification is distributed uniformly over the moist top surface of the conveyor in a layer 12 of predetermined thickness, by a fluff box distributor 13. Finely divided silica may also be incorporated in the mixture forming the base layer 12. A picker roll 14 serves to approximately level the layer, and further levelling, densification and deaeration of the base layer is effected by means of hollow perforate rolls 15 which rest upon the base layer passing thereunder and lightly pack the base layer. Further consolidation of the base layer into a sheet of uniform thickness is brought about by passing it through the bight of a set of press rolls 16. Water is distributed by spreader 17 over the smoothed surface of the base layer in amount which is preferably limited to approximately that necessary for hydrating the cement component of the base layer.

After the base layer has advanced a distance sufficient to allow for absorption of applied moisture therethrough, the consolidated and moistened base layer is carried by the conveyor beneath a vibrator 18 which deposits thereon a thin coating layer 19 of finely divided dry mineral particles or grains. Layer 19 has only sufficient thickness to provide an efficient parting zone for a later operating step of the process which is to be hereinafter described.

The grains forming the parting layer 19 which is laid down by vibrator 18 may comprise finely divided silica, or they may comprise finely divided mineral pigments such as chromium oxide, iron oxide, or other granules suitable for imparting a colored surface to the finished shingle and of forming a parting or cleavage zone between the base layer 12 and a second layer of fiber-cement composition which is applied as a top layer 20 of a composite sheet. The base layer 12 having been partially consolidated and moistened prior to application of the layer 19, the parting and surfacing grains at the bottom of the layer 19 tend to stick to the base with minimum tendency to shift from the position in which they were originally distributed by the screen 18.

Over the top surface of the layer 19 there is then distributed another layer 20 of approximately the original dry thickness of the base layer 12, layer 20 comprising a fluffed dry mixture comprising finely divided hydraulic cement and short asbestos fibers, with or without finely divided silica. Such top layer 20 is distributed uniformly over the surface of the parting layer 19 by means of a fluff box 21, and a second picker roll 22 operates to approximately level the layer material thus distributed by element 21. Preliminary densification and deaeration of the dry top layer is carried out by hollow perforate rolls 23 which rest upon the material passing thereunder and pack it to a slight extent. Further consolidation of the dry layer 20 is effected by passing the composite sheets between a set of press rolls 24. Sufficient water to hydrate the cement in the top layer 20 is applied by distributor 25 over the top surface of the composite sheet.

After allowing sufficient time for the water to soak through the top layer 20, the composite sheet may be conducted by an extension of conveyor 10 under a cutter roller 26. Cutter 26 divides the sheet into segments or panels 27 which may have a slightly larger area than the finished shingles or siding units into which the segments are finally trimmed. The moist compressible green composite segments 27 are then passed through the bight of a pair of smooth faced hydraulic press rolls 28. The rolls 28 are designed to place each composite sheet segment 27 under high pressure whereby to densify the segments to a predetermined final thickness. In place of the press rolls 28 a hydraulic plate press employing spacing plates may be used for this high pressure densifying operation. During the final densifying operation the composite sheet segments 27 are strongly compressed under pressures which may range from say 5000 to 10,000 lbs. per square inch.

It has been found that a thin layer 19 of finely divided sand or other finely divided mineral grains containing as little as 10–15 ounces of grains per square foot of surface, is adequate for functioning efficiently as a cleavage and parting layer along which thin composite segments 27 of ⅛" to ¼" thickness may be split at any period in the process following the densifying operation by the press rolls 28. A parting layer 19 of minimum thickness is desirable in order to avoid premature splitting or cracking of the outside layers of the uncured green composite segments 27 under the high applied pressures of the press 28. Experience has shown that the particles or grains which are used to form the parting and coating layer may comprise natural hard mineral grains of irregular shape classifying as to size chiefly in the range finer than 28 mesh and coarser than 100 mesh.

After completing the densifying operation the consolidated composite sheet segments 27 are preferably allowed to develop a preliminary air set before being punched or trimmed to precise final dimensions. This air set is obtained, for example, by allowing the segments to stand at normal atmospheric temperature for a period of 2–5 days; after which the segments are trimmed or punched to final dimension and form. At this stage the trimming and punching operations may be carried out without danger of separating or splitting the composite segments along the line of the parting layer 19.

Final cure of the composite sheets may be effected by normal air curing. Preferably, however, the compositions of the base and top layers 12 and 20 of the composite sheet include finely divided silica as well as Portland or other hydraulic cement. When silica is present in the face layers of the sheet, the final curing operation is preferably effected by confining the sheets in a closed autoclave 30 in the presence of saturated steam under pressure. This steam cure may be carried out at a temperature equivalent to a steam pressure range of say 70–150 lbs. per square inch gauge. A complete set can be developed by this steam curing treatment within a period of less than 24 hours. During this final curing treatment a strong adherent bond is developed in the base layers of the segments 27, while an interlocking mechanical bond is maintained between the grains forming the intermediate parting layer 19.

The final step in the process consists in splitting the cured composite segments 27 along the plane of the parting layer 19 into two finished shingles or siding sheets 31 each having attractive irregular textured surfaces 32 such as portrayed in Fig. 3. This splitting operation is readily effected either by striking an edge of the segment 27 lightly against a striking surface with sufficient force to initiate the splitting action, or by one or two light taps on a splitting tool such as a chisel inserted at the edge of the parting layer.

The compositions of the outer layers 12 and 20 of the composite segments 27 may comprise Portland cement and asbestos fibers in approximately the proportions normally used in the manufacture of asbestos and cement shingles, for example 100 parts of the cement to 60–100 parts asbestos fibers. The outside layers of the segments 27 preferably include finely divided silica in amounts representing 30–70 parts of silica to 100 parts of cement. A suitable size classification of asbestos fiber for the base layers 12 and 20 is a grade of fiber classifying approximately 45% retained on a 10 mesh screen and 55% passing a 10 mesh screen, by the Standard Quebec screen test.

The invention contemplates controlling the amount and individual sizes of mineral grains forming the parting and coating layer, and the methods of forming, consolidating and moistening the respective fiber-cement facing layers, to produce a composite multilayer sheet which will not be delaminated or injured by the high pressure densifying operation which precedes the cure. The mineral grains forming the coating and parting layer 19 are of irregular angular shape and those grains immediately in contact with the layers 12 and 20 are embedded in and bonded thereto during the densifying and curing operations. The grains forming the core of layer 19 are loose or only very lightly cemented so that these grains rearrange themselves under the high pressures of the press rolls 24 and 28 into interlocked relation (Fig. 4) forming a mechanical bond which can be readily broken along intersecting cleavage planes about and between grains. This permits easy splitting of the composite sheet 27, either before or after cure, to form two thin shingles or siding units 31 each of which has an attractive irregular textured surface 32 thinly coated with some of the grains abstracted from the parting layer of the composite sheet. The angular particles or grains forming the parting layer are preferably composed of hard and strong minerals which resist individual grain fracture. The cement binder in the surface layers of the composite sheet is so proportioned as to develop under the high pressure densifying operation a cohesive bond of such strength as to resist fracture of these outside layers during subsequent steps of the process, whether the splitting takes place before or after cure.

The present method of producing asbestos-cement shingles and siding sheets is well adapted for producing strongly bonded products by a continuous operation. The method is designed for imparting an attractive irregular textured surface to each shingle or siding sheet, and for doubling the output capacity of the equipment which is employed. In other words the present method makes it possible to turn out twice the number of finished shingles or siding sheets using substantially the same equipment originally designed for producing a unit number of finished sheets in a unit period of time.

Since many variations may be made from the illustrative details given, without departing from the scope of the invention, it is intended that the invention should be limited only by the terms of the claims interpreted as broadly as consistent with novelty over the prior art.

What I claim is:

1. In the manufacture of hard and dense fibro-cementitious sheets having irregular textured surfaces, the steps comprising, uniformly distributing finely divided mineral grains over the face of a compressible fiber-cement base layer to form a thin parting and coating layer, superimposing on said parting and coating layer a top layer of compressible fiber-cement composition, highly compressing the composite sheet thus formed thereby densifying the base and top layers, and splitting the densified sheet along intersecting planes of cleavage formed about and between the grains in the coating and parting layer.

2. In producing hard and dense fibro-cementitious sheets having irregular textured surfaces the steps comprising, uniformly distributing finely divided mineral grains over the face of a moist compressible uncured fiber-cement base layer to form a thin parting and coating layer, superimposing on said parting and coating layer a top layer of moist compressible uncured fiber-cement composition, highly compressing the composite sheet thus formed thereby densifying the base and top layers, and splitting the composite sheet along intersecting planes of cleavage formed about and between interlocking grains in the coating and parting layer to form two finished sheets.

3. The method of manufacturing two hard and dense fibro-cementitious sheets each having an irregular textured surface which comprises, uniformly distributing over the surface of a moving conveyor a dry mixture layer comprising finely divided hydraulic cement and reinforcing fibers, compressing said layer and wetting it with sufficient water to hydrate the cement, uniformly distributing finely divided mineral grains over the moist face of the base layer to form a parting and coating layer, uniformly distributing over the parting and coating layer another dry mixture layer comprising finely divided hydraulic cement and reinforcing fibers, compressing the top layer thus formed and wetting it with sufficient water to hydrate the cement, highly compressing the composite sheet, developing a hardening set of the cement component of the composite sheet, and splitting the sheet along irregular intersecting planes of cleavage formed about and between interlocking grains in the parting and coating layer.

4. The process of manufacturing asbestos-cement sheets having irregular textured surfaces at twice the normal rate which comprises, uniformly distributing over the surface of a travelling conveyor a dry mixture layer comprising finely divided hydraulic cement and asbestos fibers, continuously advancing said layer while performing the steps of compressing said layer and wetting it with sufficient water to hydrate the cement, uniformly distributing dry finely divided mineral grains over the moist face of the base layer as a parting and coating layer, uniformly distributing over the parting and coating layer another dry mixture layer comprising finely divided hydraulic cement and asbestos fibers, compressing the top layer thus formed and wetting it with sufficient water to hydrate the cement, and highly compressing the composite sheet, said composite sheets being finally split along irregular intersecting planes of cleavage formed about and between interlocking grains in the parting and coating layer.

5. The method of manufacturing hard and dense asbestos-cement shingles having an irregular textured surface which comprises, forming a dry mixture layer comprising finely divided hydraulic cement, finely divided silica and asbestos fibers, compressing said layer and wetting it with sufficient water to hydrate the cement, uniformly distributing dry finely divided mineral grains over the moist face of the base layer to form a thin parting and coating layer, uniformly distributing over the parting and coating layer another dry mixture layer comprising finely divided hydraulic cement and finely divided silica and asbestos fibers, compressing the top layer thus formed and wetting it with sufficient water to hydrate the cement, densifying the composite sheet under a pressure of at least 5000 lbs. per square inch, developing a hardening set of the cement component of the composite sheet by curing it in an atmosphere of saturated steam under a pressure of the order of 75–150 lbs. per square inch gauge, and splitting the sheet along irregular intersecting planes of cleavage formed about and between interlocking grains in the parting and coating layer to form two shingles each having some of said grains bonded to and protruding from the textured surface thereof.

DUDLEY T. COLTON.

REFERENCES CITED

The following references are of record in the file of this patent:

UNITED STATES PATENTS

| Number | Name | Date |
|---|---|---|
| 933,979 | Gustiana | Sept. 14, 1909 |
| 1,453,382 | D'Alessandro et al. | May 1, 1923 |
| 1,534,353 | Besser | Apr. 21, 1925 |
| 1,684,525 | Tomarin | Sept. 18, 1928 |
| 1,768,922 | Oliver | July 1, 1930 |
| 1,931,018 | Calkins | Oct. 17, 1933 |